(12) United States Patent
Dubeyko et al.

(10) Patent No.: US 10,521,306 B2
(45) Date of Patent: Dec. 31, 2019

(54) METHODS, SYSTEMS AND DEVICES FOR RESTARTING DATA PROCESSING UNITS

(71) Applicant: Western Digital Technologies, Inc., Irvine, CA (US)

(72) Inventors: Viacheslav Anatolyevich Dubeyko, San Jose, CA (US); Luis Vitorio Cargnini, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 215 days.

(21) Appl. No.: 15/661,431

(22) Filed: Jul. 27, 2017

(65) Prior Publication Data
US 2019/0034281 A1   Jan. 31, 2019

(51) Int. Cl.
*G06F 11/00* (2006.01)
*G06F 11/14* (2006.01)
*G06F 11/07* (2006.01)

(52) U.S. Cl.
CPC ........ *G06F 11/1441* (2013.01); *G06F 11/079* (2013.01); *G06F 11/0724* (2013.01); *G06F 11/0757* (2013.01); *G06F 2201/805* (2013.01)

(58) Field of Classification Search
CPC ............. G06F 11/0724; G06F 11/0757; G06F 11/079; G06F 11/1441
See application file for complete search history.

(56) References Cited

U.S. PATENT DOCUMENTS

| | | | | |
|---|---|---|---|---|
| 8,095,828 | B1* | 1/2012 | Westenberg | G06F 11/0727 714/20 |
| 8,621,062 | B1* | 12/2013 | Anderson | G06F 11/30 709/223 |
| 2007/0174661 | A1* | 7/2007 | Peddada | G06F 11/2025 714/4.4 |
| 2017/0126479 | A1* | 5/2017 | Vangheepuram | H04L 41/0654 |

\* cited by examiner

*Primary Examiner* — Michael Maskulinski
(74) *Attorney, Agent, or Firm* — Chang & Hale LLP

(57) ABSTRACT

Systems and methods are disclosed for maintaining a status of a respective data processing unit (DPU) of a plurality of data processing units, each coupled to non-volatile memory. In some embodiments a first DPU is configured to execute one or more persistent processes, wherein the one or more processes persist in the non-volatile memory over power cycles, generate a first broadcast message upon completion of a first persistent process, transmit the first broadcast message to a set of DPUs associated with monitoring the first DPU, receive a second broadcast message from a second DPU of the set of DPUs and assign a value indicating an active status for the second DPU in a status table to track the status of each DPU of the set of DPUs.

21 Claims, 12 Drawing Sheets

METHODS, SYSTEMS AND DEVICES FOR RESTARTING DATA PROCESSING UNITS

RELATED APPLICATION

This application incorporates by reference U.S. application Ser. No. 15/395,474 filed Dec. 30, 2016, entitled PROCESSOR IN NON-VOLATILE STORAGE MEMORY in its entirety. This application also incorporates by reference U.S. application Ser. No. 15/395,415 filed Dec. 30, 2016, entitled PROCESSOR IN NON-VOLATILE STORAGE MEMORY in its entirety.

BACKGROUND

Field

The present disclosure generally relates to a novel computing architecture utilizing non-volatile memory. More specifically, the present disclosure relates to methods, systems and devices for storing, accessing and manipulating data in non-volatile memory arrays supported by data processing units allowing for in-place computations.

Description of Related Art

Modern computing techniques rely on a centralized approach to processing data using a central processing unit (CPU) and transferring data back and forth from storage. This transfer of data for tasks such as retrieving information, storing calculated results, and in some cases verifying the results, is a noticeable bottleneck in a centralized processing approach to computer architecture. Additionally, a centralized computer architecture utilizes random-access-memory (RAM) to perform processes of an operating system (OS). In this methodology a CPU retrieves data from a storage device, performs operations on the data in RAM and then returns results to the storage device for persistent storage. Nonetheless, existing storage devices such as disk drives are relatively slow to read and write data. As computing systems evolve to implementation of data storage technology with faster read and write speeds, a centralized approach to computing will lead to data processing limitations.

SUMMARY

In accordance with some implementations, the present disclosure relates to a computing system comprising a plurality of data processing units (DPUs) each coupled to non-volatile memory. A first DPU of the plurality of DPUs is configured to execute one or more persistent processes, wherein the one or more processes persist in the non-volatile memory over power cycles. The first DPU is also configured to generate a first broadcast message and transmit the first broadcast message to a set of DPUs associated with monitoring the first DPU. The first DPU is further configured to receive a second broadcast message from a second DPU of the set of DPUs and assign a value indicating an active status for the second DPU in a status table to track the status of each DPU of the set of DPUs.

In some embodiments, the first DPU is configured to generate the first broadcast message upon completion of a first persistent process or in response to detecting completion of the first persistent process. In some embodiments, the first broadcast message indicates an active state of the first DPU.

In some embodiments, the first DPU is further configured to determine a failure to receive the second broadcast message from the second DPU after a period of time exceeding a timing threshold and assign a value indicating an inactive status for the second DPU in the status table.

In some embodiments, the first DPU is further configured to transmit a restart command to the second DPU in response to determining the failure to receive the second broadcast message after a period of time exceeding a timing threshold. In some embodiments, the first DPU is further configured to transmit a status inquiry request to the second DPU in response to determining the failure to receive the second broadcast message after a period of time exceeding a timing threshold. In some embodiments, the first DPU is further configured to determine a failure to receive a response to the status inquiry request from the second DPU after a period of time exceeding the timing threshold and transmit a restart command to the second DPU in response to determining the failure to receive the response to the status inquiry request.

In some embodiments, the first DPU is further configured to receive a response to the status inquiry request from the second DPU and assign the value indicating an active status for the second DPU in the status table to track the status of each DPU of the set of DPUs.

In some embodiments, the first DPU is further configured to receive a restart command and perform a self-restart operation in response to receiving the restart command. In some embodiments, the first DPU is further configured to transmit a third broadcast message to the set of DPUs associated with monitoring the first DPU upon successful completion of the self-restart operation.

In accordance with some implementations, the present disclosure relates to a first data processing unit (DPU) of a plurality of DPUs, each coupled to non-volatile memory. The first DPU is configured to execute one or more persistent processes, wherein the one or more processes persist in the non-volatile memory over power cycles. In some embodiments, the first DPU is configured to generate a first broadcast message and transmit the first broadcast message to a set of DPUs associated with monitoring the first DPU. The first DPU is configured to receive a second broadcast message from a second DPU of the set of DPUs and assign a value indicating an active status for the second DPU in a status table to track the status of each DPU of the set of DPUs.

In some embodiments, the first DPU is configured to generate the first broadcast message upon completion of a first persistent process or in response to detecting completion of the first persistent process. In some embodiments, the first broadcast message indicates an active state of the first DPU.

In some embodiments, the first DPU is further configured to determine a failure to receive the second broadcast message from the second DPU after a period of time exceeding a timing threshold and assign a value indicating an inactive status for the second DPU in the status table.

In some embodiments, the first DPU is further configured to transmit a restart command to the second DPU in response to determining the failure to receive the second broadcast message after a period of time exceeding a timing threshold. In some embodiments, the first DPU is further configured to transmit a status inquiry request to the second DPU in response to determining the failure to receive the second broadcast message after a period of time exceeding a timing threshold. In some embodiments, the first DPU is further configured to determine a failure to receive a response to the status inquiry request from the second DPU after a period of time exceeding the timing threshold and transmit a restart command to the second DPU in response to determining the failure to receive the response to the status inquiry request.

In some embodiments, the first DPU is further configured to receive a response to the status inquiry request from the second DPU and assign the value indicating an active status for the second DPU in the status table to track the status of each DPU of the set of DPUs.

In some embodiments, the first DPU is further configured to receive a restart command and perform a self-restart operation in response to receiving the restart command. In some embodiments, the first DPU is further configured to transmit a third broadcast message to the set of DPUs associated with monitoring the first DPU upon successful completion of the self-restart operation.

In accordance with some implementations, the present disclosure relates to a method of maintaining status of a respective data processing unit (DPU) of a plurality of DPUs, each coupled to non-volatile memory, the method at a first DPU comprising executing one or more persistent processes, wherein the one or more processes persist in the non-volatile memory over power cycles. The method comprises generating a first broadcast message and transmitting the first broadcast message to a set of DPUs associated with monitoring the first DPU. The method further comprises receiving a second broadcast message from a second DPU of the set of DPUs and assigning a value indicating an active status for the second DPU in a status table to track the status of each DPU of the set of DPUs.

In some implementations, generating the first broadcast message includes generating a first broadcast message upon completion of a first persistent process or in response to detecting completion of the first persistent process. In some implementations, the first broadcast message indicates an active state of the first DPU.

In some implementations, the method further comprises determining a failure to receive the second broadcast message from the second DPU after a period of time exceeding a timing threshold and assigning a value indicating an inactive status for the second DPU in the status table.

In some implementations, the method further comprises transmitting a restart command to the second DPU in response to determining the failure to receive the second broadcast message after a period of time exceeding a timing threshold. In some implementations, the method further comprises transmitting a status inquiry request to the second DPU in response to determining the failure to receive the second broadcast message after a period of time exceeding a timing threshold.

In some implementations, the method further comprises determining a failure to receive a response to the status inquiry request from the second DPU after a period of time exceeding the timing threshold, and transmitting a restart command to the second DPU in response to determining the failure to receive the response to the status inquiry request.

In some implementations, the method further comprises receiving a response to the status inquiry request from the second DPU and assigning the value indicating an active status for the second DPU in the status table to track the status of each DPU of the set of DPUs.

In some implementations, the method further comprises receiving a restart command and performing a self-restart operation in response to receiving the restart command. In some implementations, the method further comprises transmitting a third broadcast message to the set of DPUs associated with monitoring the first DPU upon successful completion of the self-restart operation.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
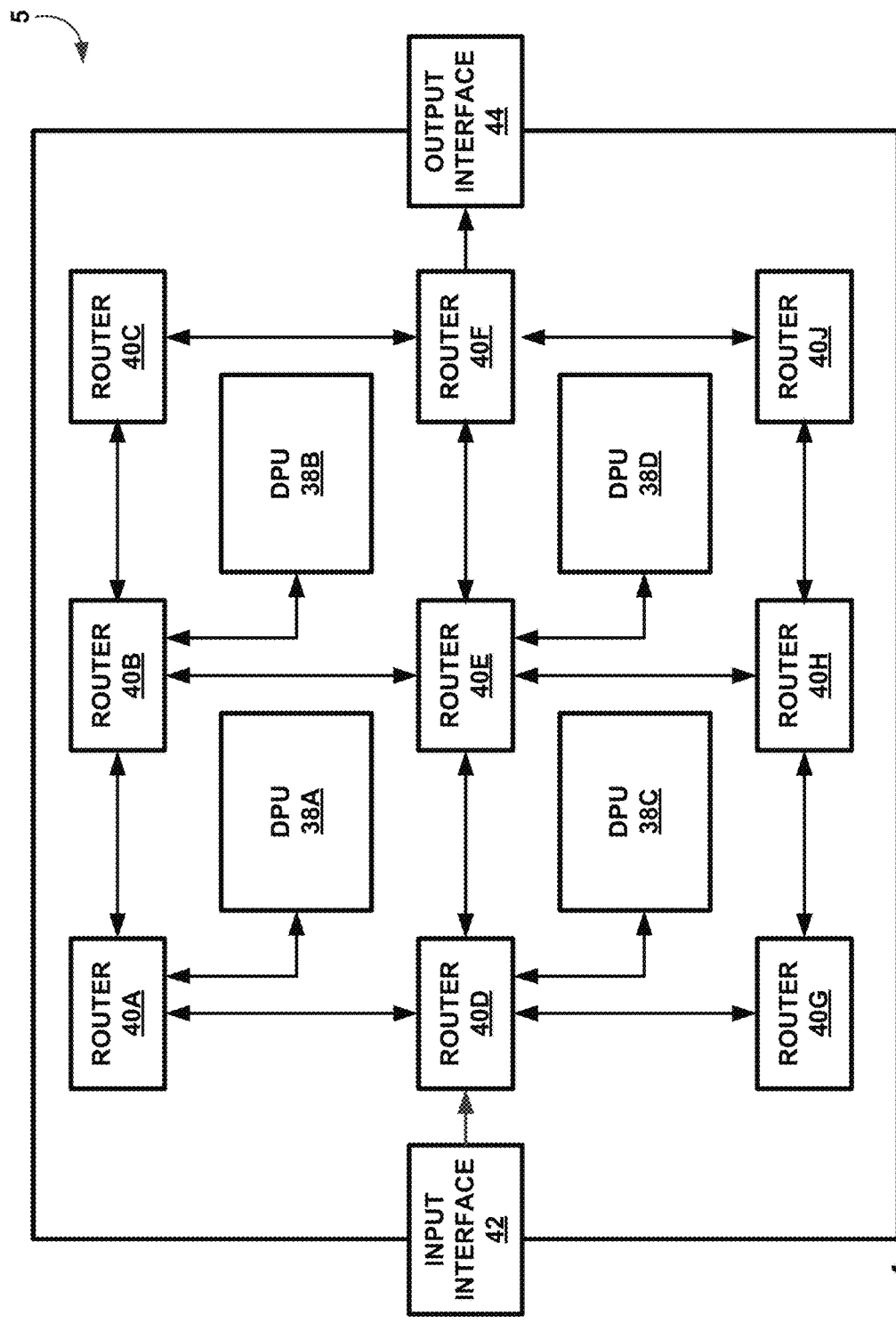
FIG. 1 is a block diagram illustrating an example computing system that includes a plurality of data processing units (DPUs) according to one or more embodiments.

While certain embodiments are described, these embodiments are presented by way of example only and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

The headings provided herein are for convenience only and do not necessarily affect the scope or meaning of the claimed invention. Disclosed herein are examples, implementations, configurations, and/or embodiments relating to restarting data processing units.

PiNVSM Computing Architecture Overview

In accordance with one or more embodiments, a computing architecture is disclosed in which a set of one or more processing units are each associated with a portion of persistent data storage and may process data in-place. For instance, a "processor-in-non-volatile-storage-memory" (PiNVSM) device on a semiconductor chip may be able to persistently store large amounts of data and to process the persistently stored data without the use of a central processing unit (CPU). In this example, as both the one or more processing units and the non-volatile storage memory (NVSM) are included on the same chip or packaging, the rate at which the one or more processing units may access data stored by the NVSM (i.e., latency) may be reduced. In some embodiments, a PiNVSM device may be implemented on a single semiconductor chip and may include a processing unit connected to an associated memory subarray of non-volatile memory. In some embodiments, a PiNVSM device may be implemented in a packaged module. A PiNVSM system may include a plurality of PiNVSM devices connected to each other in various configurations via various communication buses or channels (wired or wireless).

In some embodiments, one or more processing units of a PiNVSM device perform various mathematical and/or logic operations. In some embodiments, a PiNVSM device includes one or more arithmetic logic units (ALUs). For example, the ALUs may each be configured to perform integer arithmetic and logical operations (e.g., AND, NAND, OR, NOR, XOR, NOT). In some embodiments, the PiNVSM device may include one or more floating point units (FPUs), which may each be configured to perform non-integer calculations, such as division operations, which may generate a fraction, or a "floating point" number. In some examples, the PiNVSM device may include both one or more processing units (PU), and one or more field-programmable gate arrays (FPGAs). Processing units in some embodiments may be pre-fabricated in hardware to perform specific computations or data manipulations. For example, the processing units may be pre-fabricated with only specific circuit logic (such as ASICs) to perform a specific calculation. Alternatively, processing units may be programmable processing units that can be programmed dynamically to perform computations or data manipulations based on execution codes.

FIG. 1 is a block diagram illustrating an example computing system that includes a plurality of data processing units (DPUs) according to one or more embodiments. For the purpose of illustration, a PiNVSM device may, in some embodiments, be a single semiconductor chip and may include a processing unit connected to an associated memory subarray of non-volatile memory. As shown in FIG. 1, computing system 5 may include one or more data processing units (DPUs) 38A-38D (collectively, "DPUs 38"), one or more routers 40A-40J (collectively, "routers 40"), input interface 42, and output interface 44. In some examples, computing system 5 may be a standalone computing system where a separate host device is not present.

Input interface 42 may be configured to obtain input data. For instance, input interface 42 may obtain digital audio data, digital video data, text data (i.e., entered via keyboard), position data (i.e., entered via a mouse), and any other type of digital data. Output interface 44 may be configured to provide output data. For instance, output interface 44 may output digital audio data, digital video data, one or more management actions, and any other type of output data.

Routers 40 may each be configured to route data around computing system 5. In some examples, routers 40 may form a network on chip (NoC) architecture, such as the NoC architecture discussed in U.S. patent application Ser. No. 14/922,547 Titled "Fabric Interconnection for Memory Banks Based on Network-On-Chip Methodology" filed on Oct. 26, 2015 and/or U.S. patent application Ser. No. 14/927,670 Titled "Multilayer 3D Memory Based on Network-On-Chip Interconnection" filed on Oct. 27, 2015. As shown in FIG. 1, routers 40 may be interconnected via wires, traces, or any other conductive means. Routers 40 may route data and/or instructions around computing system 5. For instance, routers 40 may enable the transport/transfer/exchange of data and/or instructions amongst DPUs 38, input interface 42, and/or output interface 44. By enabling a NoC architecture, routers 40 may enable a reduction in a size of computing system 5 (i.e., as separate tracks between components may be eliminated).

DPUs 38 may each be configured to store and process data. DPUs 38 may each include a plurality of PiNVSM devices and as such, may include one or more processing units and a non-volatile memory array (NVMA) (e.g., comprising subarrays of non-volatile memory). For the purpose of illustration, a PiNVSM device may be a single semiconductor chip and may include one or more processing units connected to one or more associated memory subarrays of non-volatile memory.

Structure of a DPU

Figure 2:
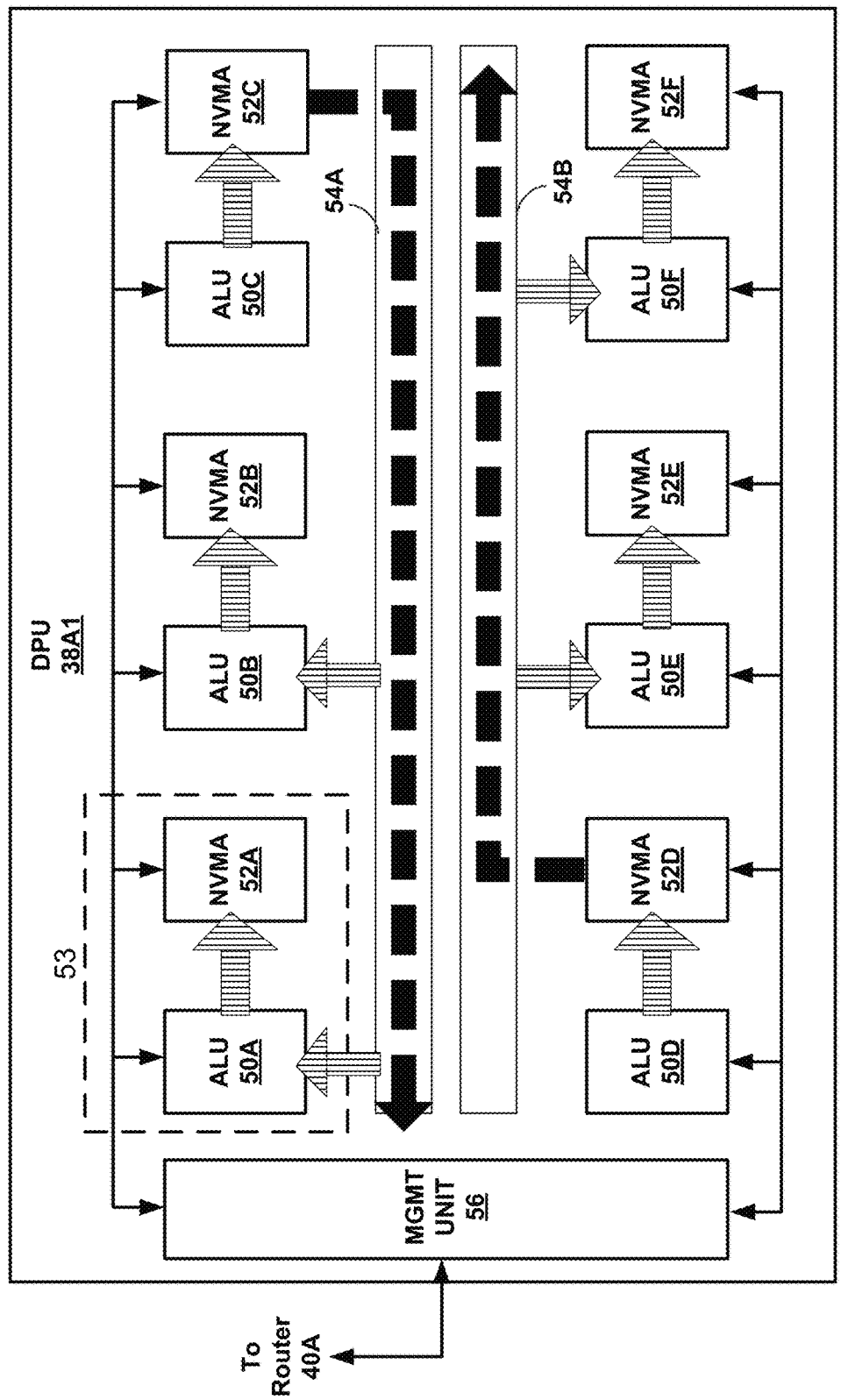
FIG. 2 is a block diagram illustrating an example data processing unit (DPU) according to one or more embodiments.

FIG. 2 is a block diagram illustrating an example data processing unit (DPU) according to one or more embodiments. DPU 38A1 in FIG. 2 may be an example of DPU 38A of FIG. 1. As shown in FIG. 2, DPU 38A1 includes arithmetic logic units (ALUs) 50A-50F (collectively, ALUs 50"), non-volatile memory arrays (NVMAs) 52A-52F (collectively, "NVMAs 52"), NVMAs 54A and 54B (collectively, "NVMAs 54"), and management unit 56. For the purpose of illustration, a PiNVSM device may be a single semiconductor chip and may include a processing unit (such as one of the ALUs 50A-50F) connected to an associated memory subarray of non-volatile memory (such as one of the NVMAs 52A-52F). For example, a PiNVSM device 53 may be represented by the dashed outline encompassing ALU 50A and NVMA 52A as shown in FIG. 2. Alternatively, a PiNVSM device may comprise a plurality of DPUs and a plurality of non-volatile memory sub-arrays of a collective non-volatile memory array, such as computing system 5 of FIG. 1.

Management unit 56 may be configured to control operation of one or more components of DPU 38A1. As shown in FIG. 2, management unit 56 may control operation of ALUs 50, NVMAs 52, and NVMAs 54. Management unit 56 may communicate with one or more components external to DPU 38A1, such as router 40A of FIG. 1.

NVMAs 52 may each represent an array of non-volatile memory that may be programmed and erased on the basis of selectable memory locations without altering data stored at other selectable memory locations. In some examples, NVMAs 52 may include any type of non-volatile memory device that may perform selectable memory location level programming and erasing without altering data stored at other selectable levels. For example, each bit in NVMAs 52 may be independently alterable without altering data stored in other bits in NVMAs 52. That is, NVMAs 52 may be configured to write a "0" or a "1" (or alter the storage state) of any single bit without changing any other accessible bit in normal operations. In some granularities, NVMAs 52 may be configured to be byte-wise alterable, word-wise alterable, double-word-wise alterable, quad-word-wise alterable, etc. This effectively allows the NVMAs 52 to have data overwritten in any granularity down to a single bit location, without the necessity of having to first "erase" an entire block of bits (as in traditional Flash Memory). In some examples, NVMAs 52 may be storage class memory. Some examples, of NVMAs 52 include, but are not limited to phase-change memory (PCM) devices, resistive random-access memory (ReRAM) devices, magnetoresistive random-access memory (MRAM) devices, ferroelectric random-access memory (FeRAM), holographic memory devices, and any other type of non-volatile memory devices capable of being written to at a location level without altering data stored at other selectable levels.

In some examples, NVMAs 52 and 54 may use multiple levels of granularity to access data (i.e., without the need to have fixed page sizes). For instance, in each of the selectable locations, NVMAs 52 and 54 may work with pages, without pages, with 4K, 6K, 18K, etc., blocks of data, or 64 bytes, 128 bytes, 256 bytes, etc. at a time. In some examples, an NVMA of NVMAs 52 and 54 may modify its internal organization on-the-fly. For instance, in each of the selectable locations, an NVMA of NVMAs 52 and 54 may change partitions, change banks organization, data line association, addressable area, accessible area, and/or blocks size.

NVMAs 54 may each represent an array of non-volatile memory that may be programmed and erased at the selectable location level without altering data stored at other selectable locations. In some embodiments, NVMAs 54 include non-volatile memory used as an execution conveyor and readily accessible by all other processing units and memory arrays of DPU 38A1.

ALUs 50 may be configured to manipulate data stored within NVMAs 52. For instance, each respective ALU of ALUs 50 may be configured to manipulate data within a corresponding NVMA of NVMAs 52. In the example shown in FIG. 2, ALU 50A may be configured to manipulate data within NVMA 52A, ALU 50B may be configured to manipulate data within NVMA 52B, and ALU 50F may be configured to manipulate data within NVMA 52F. In some examples, each ALU of ALUs 50 may be an elementary ALU.

The vertically shaded arrows in FIG. 2 may represent a management and execution flow amongst the components of DPU 38A1. Similarly, the thick, solid arrows in FIG. 2 may represent instruction set flows amongst the components of DPU 38A1.

Figure 3:
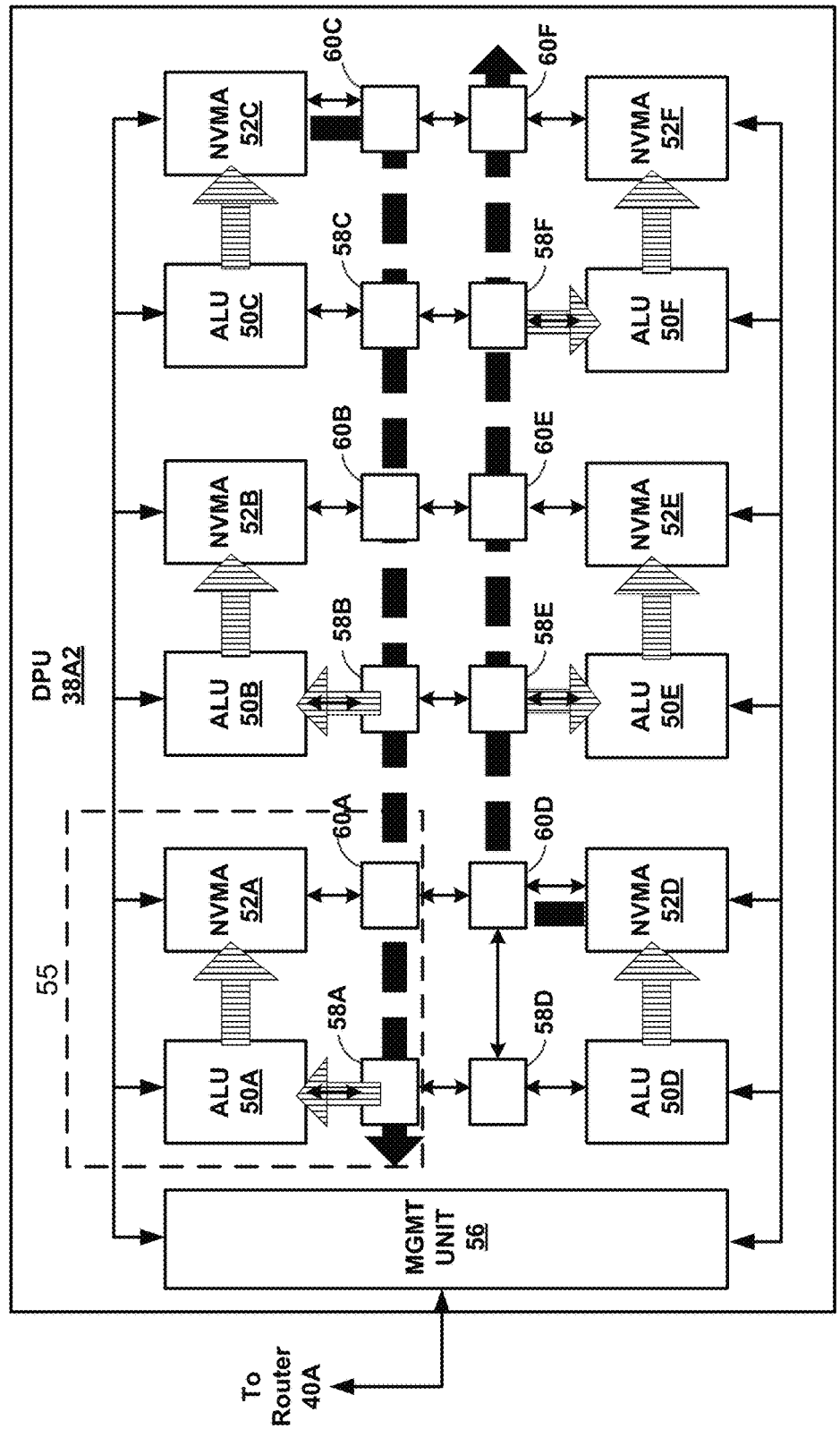
FIG. 3 is a block diagram illustrating another example data processing unit (DPU) according to one or more embodiments.

FIG. 3 is a block diagram illustrating another example data processing unit (DPU) according to one or more embodiments. DPU 38A2 in FIG. 3 may be another example of DPU 38A of FIG. 1. Similar to DPU 38A1, DPU 38A2 includes ALUs 50, NVMAs 52, and management unit 56. In addition, DPU 38A2 includes a first plurality of routers 58A-58F (collectively, "routers 58"), and a second plurality of routers 60A-60F (collectively, "routers 60").

Routers 58 and routers 60 may function as a network-on-chip (NoC) within DPU 38A2 to move data amongst components of DPU 38A2. For instance, routers 58 and routers 60 may move data amongst ALUs 50 and/or NVMAs 52. In some examples, routers 58 and routers 60 may operate on different channels and/or different operating protocols and frequencies, according to different priorities.

Similar to the example of FIG. 2, the vertically shaded arrows in FIG. 3 may represent a management and execution flow amongst the components of DPU 38A2 and the thick solid arrows in FIG. 3 may represent instruction set flows amongst the components of DPU 38A2. In some embodiments, a PiNVSM device in this DPU format may include a processing unit (such as one of the ALUs 50A-50F) connected to an associated memory subarray of non-volatile memory (such as one of the NVMAs 52A-52F), as well as one or more routers (such as one of routers 58A-58F and/or routers 60A-60F). For example, a PiNVSM device 55 may be represented by the dashed outline encompassing ALU 50A and NVMA 52A, as well as router 58A and 60A as shown in FIG. 3. Alternatively, a PiNVSM device may comprise a plurality of DPUs and a plurality of non-volatile memory sub-arrays of a collective non-volatile memory array, such as computing system 5 of FIG. 1.

Storage Space in NVSM

Figure 4:
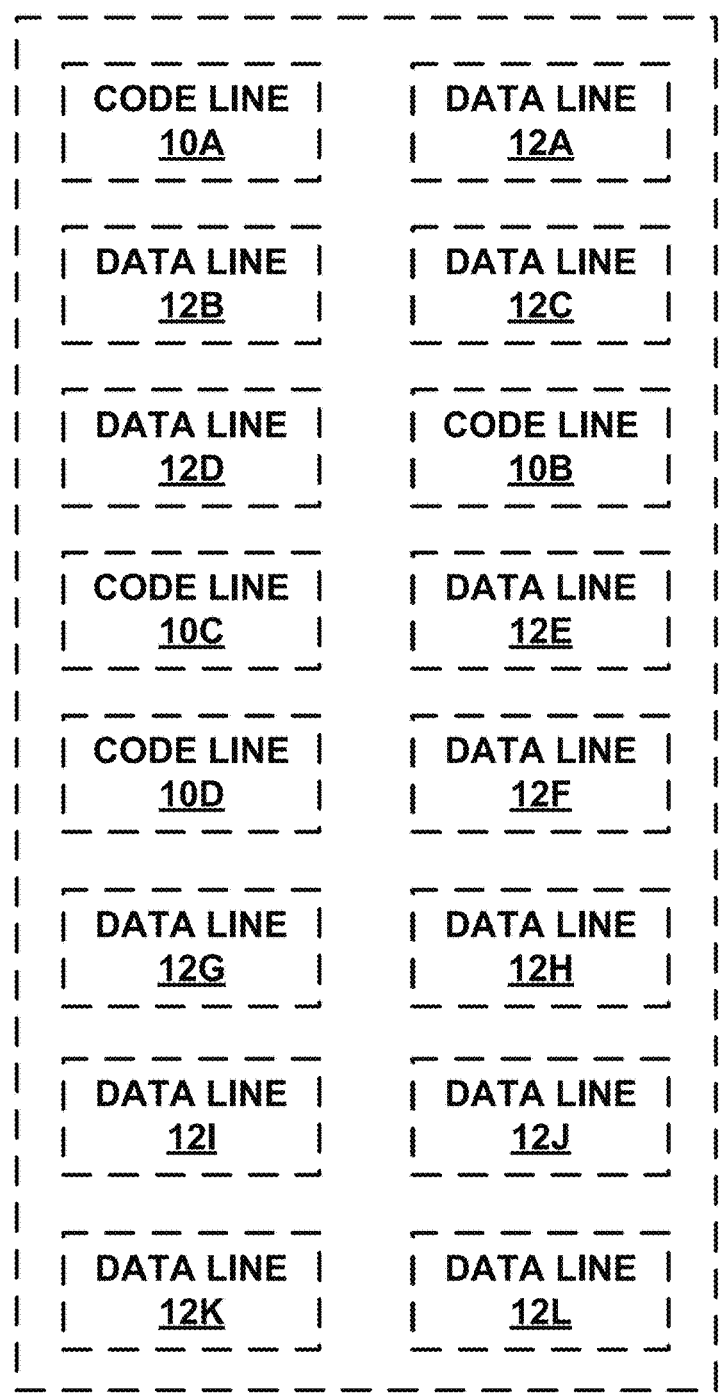
FIG. 4 is a block diagram illustrating an example storage space of a non-volatile memory storage device according to one or more embodiments.

FIG. 4 is a block diagram illustrating an example storage space of a non-volatile memory storage device according to one or more embodiments. In operation, processing units of DPUs (e.g., within one or more PiNVSM devices) may perform data manipulation based on data in selected locations of NVMA included in DPUs to generate corresponding results of the data manipulation. For instance, a processing unit may be configured to compute results for data in one or more associated data lines. As one example, a particular processing unit included in a DPU may be configured to compute results for data in a data line associated with the particular processing unit. The results of the computation may be stored in the associated data lines reserved for the results. Initial data used for the computation are only overwritten when specifically intended for overwrites. The processing units may cause NVMAs included in the DPUs to selectively program and erase data in selectable locations reserved to store results of the data manipulation based on the corresponding results. For instance, each of the processing units included in a DPU may be configured to selectively write, based on the corresponding results, data in a results portion of an associated data line.

In some examples, the processing units may perform the data manipulation based on instruction sets, such as execution code. In some embodiments, instruction sets are stored by DPUs as code lines. In some examples, the execution code in each of the code lines may contain a sequence of instructions. In some examples, a management unit may be configured to obtain the instruction sets.

As shown in FIG. 4, storage space 8 includes code lines 10A-10D (collectively, "code lines 10"), and data lines 12A-12L (collectively, "data lines 12"). In some embodiments, data lines 12 may each include some user data. For instance, each data line of data lines 12 may be an array of data items with associated operations. Also as discussed above, code lines 10 may each include an instruction set (i.e., a software primitive, execution code) that can be used for manipulation of user data of data lines 12. In other words, a code line of code lines 10 may be a sequence of operations with the prepared environment that can be used for transformation of user data of data lines 12.

In some examples, code may be simply stored as data and it can be treated as a data line. Otherwise, the code may be copied into a particular location (e.g., a special place or execution conveyor, for example) that will be treated as a sequence of instructions (code line 10). After being used to manipulate data, a code line of code lines 10 may be transformed in data line of data lines 12 that will store results of the data manipulation and/or executable code.

Figure 5:
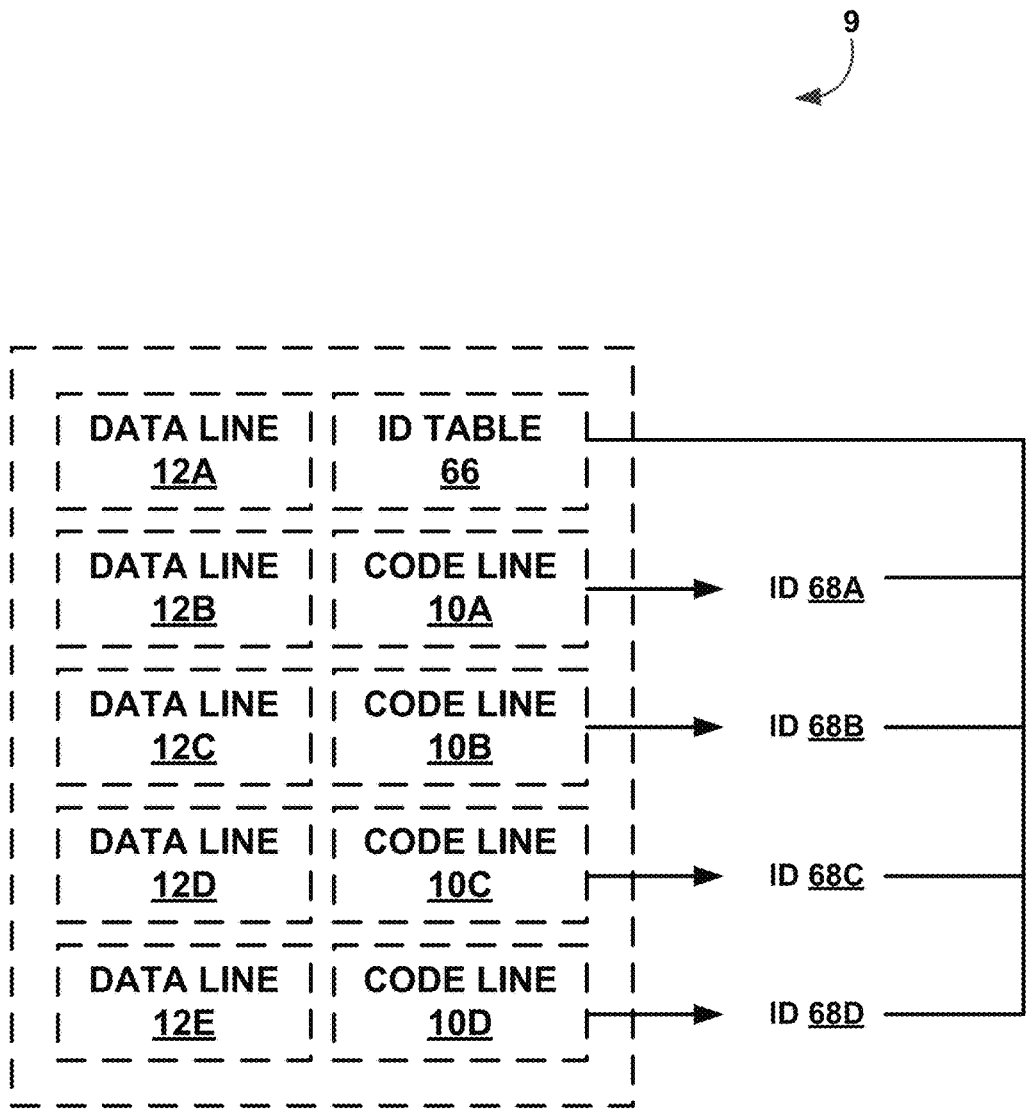
FIG. 5 is a block diagram illustrating another example storage space of a non-volatile memory storage device according to one or more embodiments.

FIG. 5 is a block diagram illustrating another example storage space of a non-volatile memory storage device according to one or more embodiments. As shown in FIG. 5, similar to storage space 8 of FIG. 4, storage space 9 includes code lines 10, and data lines 12. As also shown in FIG. 5, storage space 9 includes ID table 66.

ID table 66 may store an identification number of each instruction set (i.e., code line). For instance, ID table 66 may store a respective identification number of identification numbers 68A-68D (collectively, "IDs 68") for each of code lines 10A-10D. In some examples, each of IDs 68 may be an Inode ID, a globally unique identifier (GUID), or a hash value of the corresponding instruction set. For instance, ID 68A may be an Inode ID or a hash value of an instruction set included in code line 10A. In some examples, IDs 68 may be referred to as fingerprints of their corresponding instruction sets. In some examples, ID table 66 may be included in a hash table of a DPU, such as a DPU of DPUs 38 of FIG. 1.

Figure 6A:
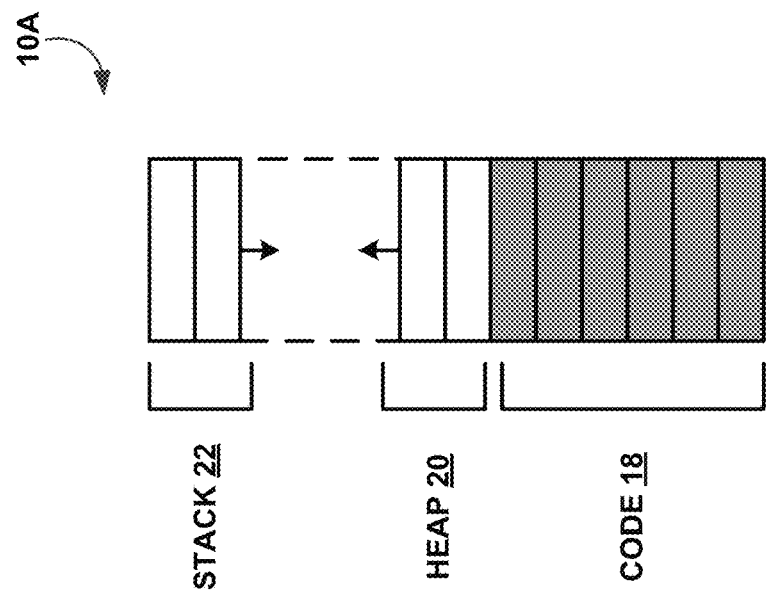
FIG. 6A is a block diagram illustrating an example structure of a data line that may be included in a processor-in-non-volatile-storage-memory (PiNVSM) device according to one or more embodiments.

FIG. 6A is a block diagram illustrating an example structure of a data line that may be included in a processor-in-non-volatile-storage-memory (PiNVSM) device according to one or more embodiments. In the NVSM, programming and erasing of data may be performed on the basis of a selectable memory location level. For instance, the NVSM may be divided into a plurality of selectable memory locations and the processing units may be able to program data or erase data at a particular selectable memory location of the plurality of selectable memory locations without altering data stored at other selectable memory locations of the plurality of selectable memory locations. Some examples of NVSM include, but are not necessarily limited to, magnetoresistive random-access memory (MRAM), ferroelectric random-access memory (FeRAM), NRAM, resistive random-access memory (ReRAM), Phase Change Memory (PCM), and Mott memory.

As shown in FIG. 6A, data line 12A includes data portion 14 and results portion 16. Data portion 14 may correspond to one or more selectable locations of a PiNVSM device that store data, such as one or more selectable locations of an NVMA of NVMAs 52 of FIG. 2. Results portion 16 may correspond to one or more selectable locations of the non-volatile storage device that store results of manipulation of data, such as data stored in data portion 14. Data line 12A may be a logical structure and the selectable locations of data portion 14 and/or results portion 16 may or may not be contiguously located (meaning, in other words, may or may not have sequential physical addresses). The selectable locations that correspond to data portion 14 and the selectable locations that correspond to results portion 16 may be considered to be grouped into data line 12A.

In some examples, the selectable memory locations may be addressable memory locations. For instance, each of the selectable memory locations may have a unique numerical address, and data associated with a particular addressable memory location may be accessed/read/written via a unique address of the particular addressable memory location. In some examples, data at a particular addressable memory location may be accessed/read/written via an access system.

In operation, one or more processing units of a PiNVSM device may perform data manipulation based on data in selected locations of non-volatile memory of the PiNVSM device, generate corresponding results of the data manipulation, and cause the non-volatile memory to selectively program and erase data in selectable locations reserved to store results of the data manipulation based on the corresponding results. As the programming and erasing of data may be performed at the selectable location level, the one or more processing units may cause the non-volatile memory to selectively program and erase data in selectable locations reserved to store results of the data manipulation without altering data stored at selectable locations other than the selectable locations reserved to store results of the data manipulation.

In some examples, the non-volatile memory space may be shared between data lines and code lines. In general, a data line may include user data. A code line may include an instruction set (i.e., a software primitive, execution code) that can be used for manipulation of data lines. Each of the data lines may include one or more selectable locations and may be associated with a processing unit. In other words, the selectable locations of the non-volatile memory may be grouped into a plurality of data lines. In some examples, at any given time, a particular selectable location may only be grouped into a single data line. As such, in some examples, the PiNVSM device may have a unique mapping between selectable locations and data lines (or code lines) such that a single selectable location is not included in two data lines (or two code lines) at the same time.

In some examples, the grouping of selectable locations into data lines may be adjustable over time. For instance, at a first time, a first group of selectable locations of a plurality of selectable locations may be associated with a particular data line that is associated with a particular processing unit. At a second time, a second group of selectable locations of the plurality of selectable locations may be associated with the particular data line. The second group of selectable locations may be different than the first group of selectable locations (i.e., include a selectable location not included in the first group and/or omit a selectable location included in the first group).

Figure 6B:
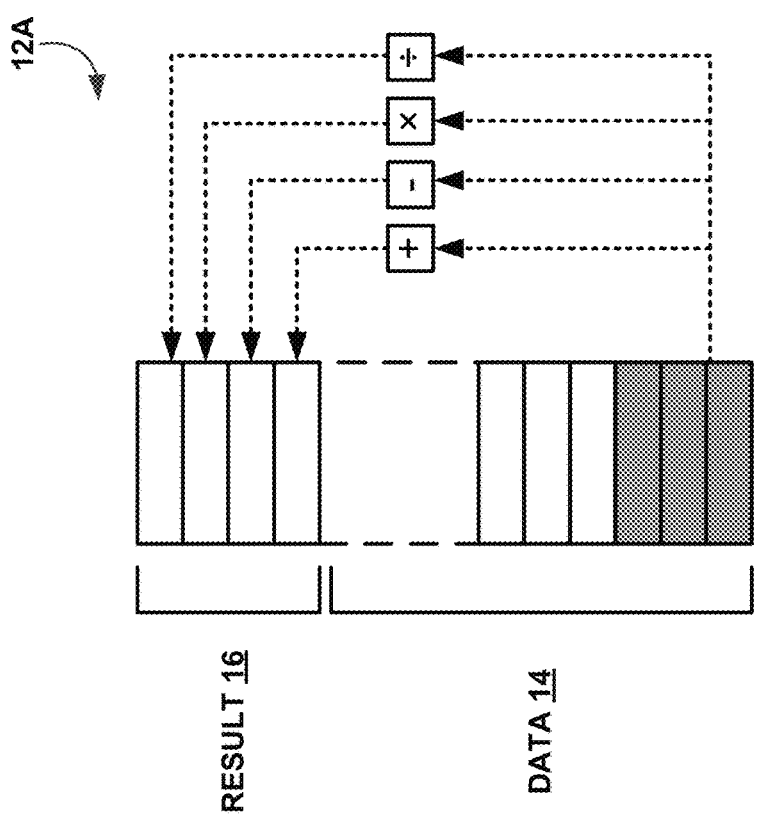
FIG. 6B is a block diagram illustrating an example structure of a code line that may be included in a PiNVSM device according to one or more embodiments.

FIG. 6B is a block diagram illustrating an example structure of a code line that may be included in a PiNVSM device according to one or more embodiments. As shown in FIG. 6B, code line 10A includes code portion 18, heap portion 20, and stack portion 22. Code portion 18 may correspond to one or more selectable locations of a non-volatile storage device that store an instruction set (e.g., a software primitive) that may be used to manipulate data. Heap portion 20 and stack portion 22 may each correspond to one or more selectable locations of a non-volatile storage device respectively used as a heap and a stack during data manipulation. Code line 10A may be a logical structure and the selectable locations of code portion 18, heap portion 20, and/or stack portion 22 may or may not be contiguously located (meaning, in other words, that these portions 18-22 may or may not be stored to memory locations having have sequential physical addresses).

Networking of DPUs

Figure 7:
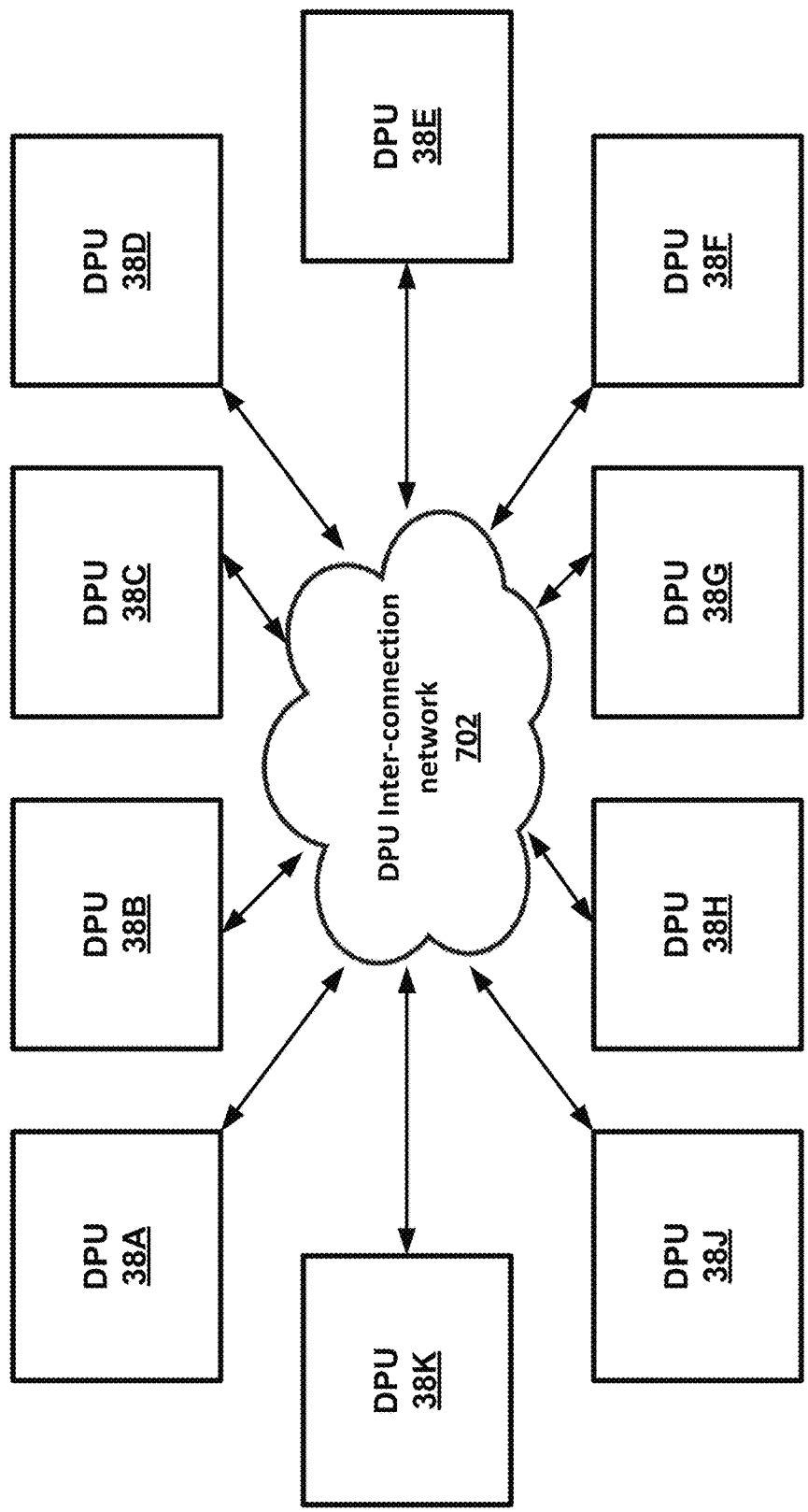
FIG. 7 is a block diagram illustrating an example networked structure of a set of data processing units according to one or more embodiments.

FIG. 7 is a block diagram illustrating an example networked structure of a set of data processing units according to one or more embodiments. As shown in FIG. 7, a set of one or more DPUs 38 (e.g., within a particular computing system, such as shown in FIG. 1), may be in communication with each other using a DPU inter-connection network 702. In some embodiments, network 702 is implemented by one or more routers, such as described above with reference to FIG. 1. In some embodiments, a DPU inter-connection network 702 is implemented within a computing system such as the one described with respect to FIG. 1.

In some embodiments, DPUs 38 may be directly inter-connected via wires, traces, or any other conductive means. These conductive means may allow routing of data and/or instructions from one DPU 38 to another. For example, network 702 may be implemented by physical connections from a given DPU 38 (e.g., DPU 38G) to a sub-group of all the DPUs 38 in the network 702 (e.g., DPU 38G is connected to DPU 38H and DPU 38F). These sub-groups of connected DPUs 38 may effectively result in all DPUs 38 of a computing system having a link to the DPU inter-connection network 702. In some embodiments, a respective DPU 38 associated with (e.g., connected to) DPU inter-connection network 702 is configured to perform one or more functions of a router, such as transferring data and/or instructions from a first DPU to a second DPU. For example, DPU 38G may be physically connected to DPU 38H which may be physically connected to DPU 38J. In this example, DPU 38H may function as a router to transfer a set of instructions from DPU 38G to DPU 38J.

Figure 8:
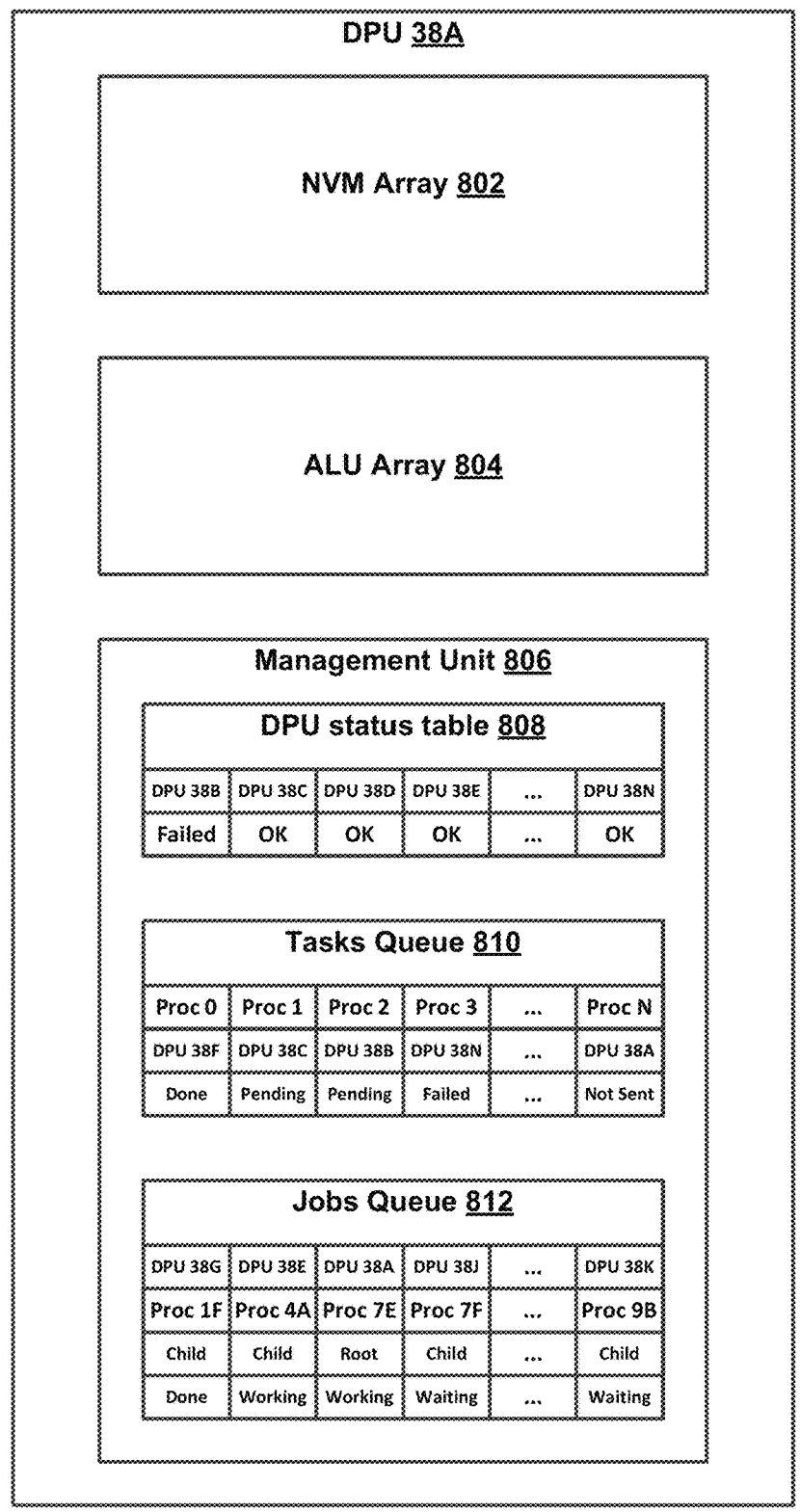
FIG. 8 is a block diagram illustrating an example structure of a management unit of a data processing unit according to one or more embodiments.

FIG. 8 is a block diagram illustrating an example structure of a management unit 806 of a data processing unit 38A, according to one or more embodiments. In this example, all the non-volatile storage of DPU 38A is abstracted to NVM Array 802. In some embodiments, NVM Array 802 comprises a plurality of non-volatile memory arrays, portions or sections, such as described above with respect to FIGS. 2 and 3. For example, DPU 38A may include a set of PiNVSM devices, each PiNVSM device of the set comprising a portion of non-volatile storage memory on-chip. Similarly, in some embodiments ALU Array 804 comprises a plurality of processing units and/or arithmetic logic units such as found on one or more PiNVSM devices of DPU 38A.

In some embodiments, a DPU such as DPU 38A includes a management unit 806. As described above with respect to FIGS. 2 and 3, a management unit 806 may be configured to control operation of one or more components of DPU 38A such as NVM Array 802 and/or ALU Array 804. In some embodiments, management unit 806 may communicate with one or more components external to DPU 38A, such as a router and/or other DPUs.

Management unit 806 of FIG. 8 is shown to include a DPU status table 808 and a tasks queue 810. In some embodiments, a DPU status table 808 includes information such as one or more identifiers (e.g., serial number, or a globally unique identifier (GUID)) for a respective DPU of the same DPU inter-connection network of which DPU 38A is a member. For example, DPU 38A is in a DPU inter-connection network (as described with respect to FIG. 7), with DPU 38B up to DPU 38N. In this example, there is at least one identifier for each of the other or "peer" DPUs of the DPU inter-connection network. In addition to an identifier, DPU status table 808 includes status information for the one or more peer DPUs of the DPU inter-connection network. For example, status information may indicate whether or not a peer DPU is "frozen" or unresponsive to communications from DPU 38A. In some embodiments, status information in DPU status table 808 may indicate a lack of received communication from a peer DPU of the DPU inter-connection network. For example, a particular DPU, such as DPU 38B may be indicated to have a status failure if DPU 38A does not receive a communication from DPU 38B within a predefined duration of time.

Tasks queue 810 illustrates an example of a listing of processes that will have corresponding instructions transmitted by management unit 806 to one or more DPUs of the DPU inter-connection network. In some embodiments, a tasks queue 810 includes one or more identifiers (e.g., serial number, an Inode ID, or a globally unique identifier (GUID)) for a respective process. In some embodiments, a respective process (e.g., process 0) is associated with a respective DPU of the DPU inter-connection network, including DPU 38A itself. Tasks queue 810 may have some identifying information for a respective DPU associated with a respective process in the queue. In some embodiments, a respective process in tasks queue 810 has an identifier related to the other processes in the queue. For example, the second process in tasks queue 810 of management unit 806 of DPU 38A may be labeled as "Process 1". In some embodiments, a respective process in tasks queue 810 has a globally unique identifier (GUID) or some other identifier that is specific to the process within the entire network of DPUs and the entire computing system.

Tasks queue 810 may also indicate the status of a respective process listed in the queue. For example, as shown in FIG. 8, a status of "Process 0" is listed as "Done," while a status of "Process 3" is listed as "Failed". In some embodiments a status is simply a binary flag indicating completion or not, while in some embodiments it is more qualitative. For example, "Process 1" is listed as "Pending" (e.g., in progress, working, incomplete, in process), while "Process N" is listed as "Not Sent" (i.e., instructions for Process N have not been sent to DPU 38A yet).

In some embodiments, processes in tasks queue 810 are child processes of one or more parent processes assigned to DPU 38A to complete. For example, a process in tasks queue 810 may be a derivative of a process in jobs queue 812. In some embodiments, jobs queue 812 is configured to list processes assigned to be completed by the DPU at which the jobs queue 812 resides. In the example shown in FIG. 8, jobs queue 812 corresponds to a list of processes assigned to be completed by DPU 38A. Jobs queue 812 may comprise identifying information pertaining to each respective process, such as a serial number, or a globally unique identifier (GUID)). Each process in jobs queue 812 may also have an associated and identified DPU, for instance a DPU from which instructions pertaining to the process were received, or pointers to such instructions were received. For example, "Process 7F" is a child process assigned to DPU 38A by DPU 38J. In some embodiments, a process in jobs queue 812 is further qualified by the nature of the process. In some embodiments a process can be a root process (e.g., an originating operating system process at the highest level of hierarchy), or a child process of a root or another process. In some embodiments, a process is added to the respective jobs queue 812 of a DPU by the DPU itself. For example, the DPU may add to its jobs queue 812, a child process of another (parent) process already assigned to the DPU.

In some embodiments, a jobs queue 812 also indicates the status of a respective process listed in the queue. For example, as shown in FIG. 8, a status of "Process 1F" is listed as "Done," while a status of "Process 7E" is listed as "Working". In some embodiments a status is simply a binary flag indicating completion or not, while in some embodiments it is more qualitative. For example, "Process 7E" is listed as "Working" (e.g., in progress, pending, incomplete, in process), while "Process 9B" is listed as "Waiting" (i.e., instructions for Process 9B have not been started at DPU 38A yet).

Figure 9:
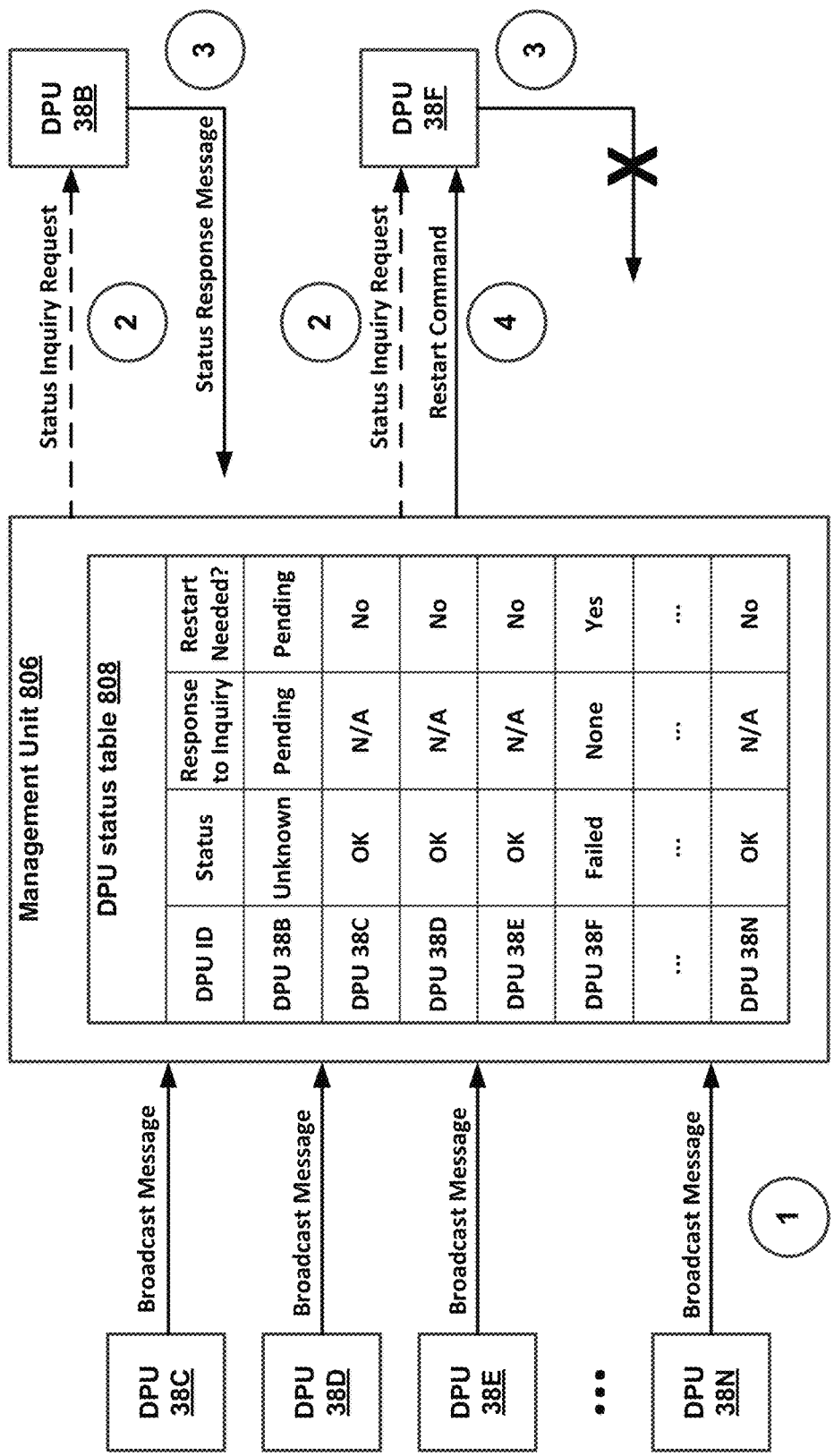
FIG. 9 is a block diagram of an example technique of restarting peer data processing units according to one or more embodiments.

FIG. 9 is a block diagram of an example technique of restarting peer data processing units according to one or more embodiments. In some embodiments, the technique can be implemented by any data processing unit of the DPU inter-connection network of data processing units, or any subset of all such data processing units. In some embodiments, a respective DPU may experience a failure, such as execution of a runaway event, corruption of code, corruption of non-volatile memory, hardware failure or running out of memory. Consequently, the respective DPU may become unresponsive and/or uncommunicative with respect to one or more peer DPUs (e.g., other DPUs of a set of DPUs). In some embodiments, a restart command received by an unresponsive DPU may allow the unresponsive DPU to recover the results of persistent processes or prevent further corruption.

As shown in FIG. 9, one or more broadcast messages may be received by a management unit 806 (such as described above with respect to FIG. 8) of a first data processing unit (e.g., DPU 38A). For example, several broadcast messages are received by management unit 806 (e.g., represented by event 1), from at least DPU 38C, DPU 38D, DPU 38E and DPU 38N. In some embodiments, a broadcast message is a dedicated communication sent by a respective DPU to one or more DPUs in association with the respective DPU (e.g., peer DPUs, predefined set of DPUs, DPUs processing related processes), to indicate that the respective DPU is in active operation. In some embodiments, a broadcast message is any type of communication from a respective DPU to a plurality of DPUs (e.g., a multi-cast or broadcasted communication).

Alternatively or additionally, a broadcast message may be any form of communication from a respective DPU to another DPU (e.g., peer-to-peer communication), such as the results of a completed process or assignment of a process for execution. DPUs may be associated with each other by related processes. For example, a first DPU may be assigned to execute a first process, for which it creates three child processes and assigns to three other DPUs for completion to help execute the first process. In this example, each of the three DPUs receiving commands to perform the child processes from the first DPU may determine that the first DPU is in an active state, based on receipt of the one or more commands. Conversely, upon receiving the results of the child processes from the three DPUs assigned to perform the child processes, the first DPU may determine that the three DPUs are in an active state, based on the received results. In this example, a process-related communication is determined to be a broadcast message by the receiving DPU.

There may be various configurations for determining which DPUs of a set of DPUs, are monitored by a respective DPU for restarting. Firstly, in some embodiments, the first data processing unit (or any other DPU), is configured to receive broadcast messages from all DPUs of the DPU inter-connection network. For example, if a set of DPUs resides on a single semiconductor die, module or portions thereof, all DPUs of the set are configured to transmit and receive broadcast messages amongst each other. Secondly, in some embodiments, the first data processing unit (or any other DPU), is configured to receive broadcast messages from a specific, predefined subset of all DPUs of the DPU inter-connection network. For example, if a subset of a larger set of DPUs are assigned as peers or neighbors, the DPUs of the subset are configured to transmit and receive broadcast messages amongst each other. Thirdly, in some embodiments, the first data processing unit (or any other DPU), is configured to receive broadcast messages from a variable subset of all DPUs of the DPU inter-connection network. For example, if ten respective DPUs are performing processes related to one or more processes being executed by the first DPU, communications from the ten DPUs are tracked by the first DPU. A corresponding status for each of the ten DPUs may be determined and entered into a DPU status table 808.

In some embodiments, management unit 806 includes a DPU status table 808, while in some embodiments, management unit 806 accesses, updates, and/or maintains DPU status table 808 residing in storage (e.g., in NVM Array 802 as described above with respect to FIG. 8). DPU status table 808 may serve to store one or more identifiers for respective data processing units (e.g., DPU 38B) and one or more status values such as a binary flag (e.g., 0 and 1, Yes and No or Alive and Failed) and/or qualitative values (e.g., OK, received, failed, pending, unknown, pinged, quiet, alive).

In some embodiments, if a first DPU or the management unit 806 of the first DPU doesn't receive a broadcast message satisfying one or more inactivity thresholds (e.g., received within a predefined time, having at least a minimum message size, comprising specific information etc.) from a second DPU, the first DPU transmits a status inquiry request to the second DPU (e.g., represented by event 2). Additionally, DPU status table 808 may include information such as a status pertaining to a status inquiry request sent to a DPU, from which a broadcast message has not been received. In some embodiments a status pertaining to a status inquiry message is only stored with respect to a DPU from which a broadcast message has not been received. Such a value may be a binary flag or a value representing a more qualitative description of such status. For example, a broadcast message was not received by DPU 38A from DPU 38B, and DPU status table 808 includes an entry of unknown status for DPU 38B, as well as a pending status for a follow-up inquiry to DPU 38B.

FIG. 9 illustrates that in some embodiments, a status response message may be received from a DPU to which a status inquiry request was transmitted (e.g., represented by event 3). For example, the first DPU (e.g., DPU 38A) sent a status inquiry request to DPU 38B, and a status response message was received from DPU 38B. However, in some embodiments a status response message is not received after transmission of a status inquiry request. As such, the first DPU may determine whether or not to send a restart command to the DPU from which a status response message has not been received. For example, if DPU 38F has not sent a status response message back to management unit 806 within a predefined threshold of time, it is determined that a restart command must be sent to DPU 38F. Restart commands may be sent to one unresponsive (e.g., frozen, hung, asleep, offline, overloaded) DPU from more than one DPU of a set of DPUs. In some embodiments a restart command is a set of instructions received by a DPU to initiate performance of a self-restart operation.

In some embodiments, a DPU performs a self-restart operation on the basis of the first restart command received and does not respond to any subsequent restart commands. For example, DPU 38F may receive ten restart commands from various DPUs in its DPU inter-connection network of DPUs. The first restart command may be received from DPU 38A (e.g., represented by event 4), and all other restart commands received within a predefined threshold of time (e.g., 60 seconds) will be ignored at DPU 38F. A restart command received by an unresponsive DPU may prompt the unresponsive DPU to undergo a power cycle (e.g., turn off and turn on), and check various data structures within its non-volatile memory (e.g., an allocation table) for recoverable data. Performing a self-restart operation may include checking the non-volatile memory for corruption (e.g., using checksum), repairing or recovering corruptions in non-volatile memory (e.g., using error correction techniques), retrieving information from other DPUs (e.g., instructions for performing processes) and/or rebuilding one or more data structures.

A restart command may be specific to a respective DPU (e.g., DPU 38F), or it may be assigned to each DPU of a set of DPUs. In the context of this disclosure a restart command is described as being specific to a respective DPU, however those of ordinary skill in the art will understand that a restart command may be assigned to an identified plurality of DPUs (e.g., DPU 38B and DPU 38F), or an unidentified plurality of DPUs (e.g., all DPUs of module 14). In some embodiments, a cold restart is performed on all DPUs of a set of DPUs, such as during initialization, powering-up of a device, powering-down of a device, calibration, or erasure of a device comprising the set of DPUs.

In some embodiments, after receiving a restart command, a respective DPU returns a broadcast message to the DPU that transmitted the restart command, and/or to all other DPUs of a set of DPUs. As described above, the DPUs of the set may all be assigned to monitor a status of responsiveness and/or communicativeness of each other DPU in the set. In some embodiments, a respective DPU may transmit a first restart command to an unresponsive DPU, wait for a broadcast message, status response message or any other type of communication from the unresponsive DPU, then transmit a second restart command if a communication is not received from the unresponsive DPU within a predefined period of time (or meeting another message quality threshold). The respective DPU may send up to a predefined number of subsequent restart commands to the unresponsive DPU before determining that the unresponsive DPU is irrecoverable with restart commands. Consequently, the respective DPU will cease to send further restart commands to the unresponsive DPU.

Figure 10:
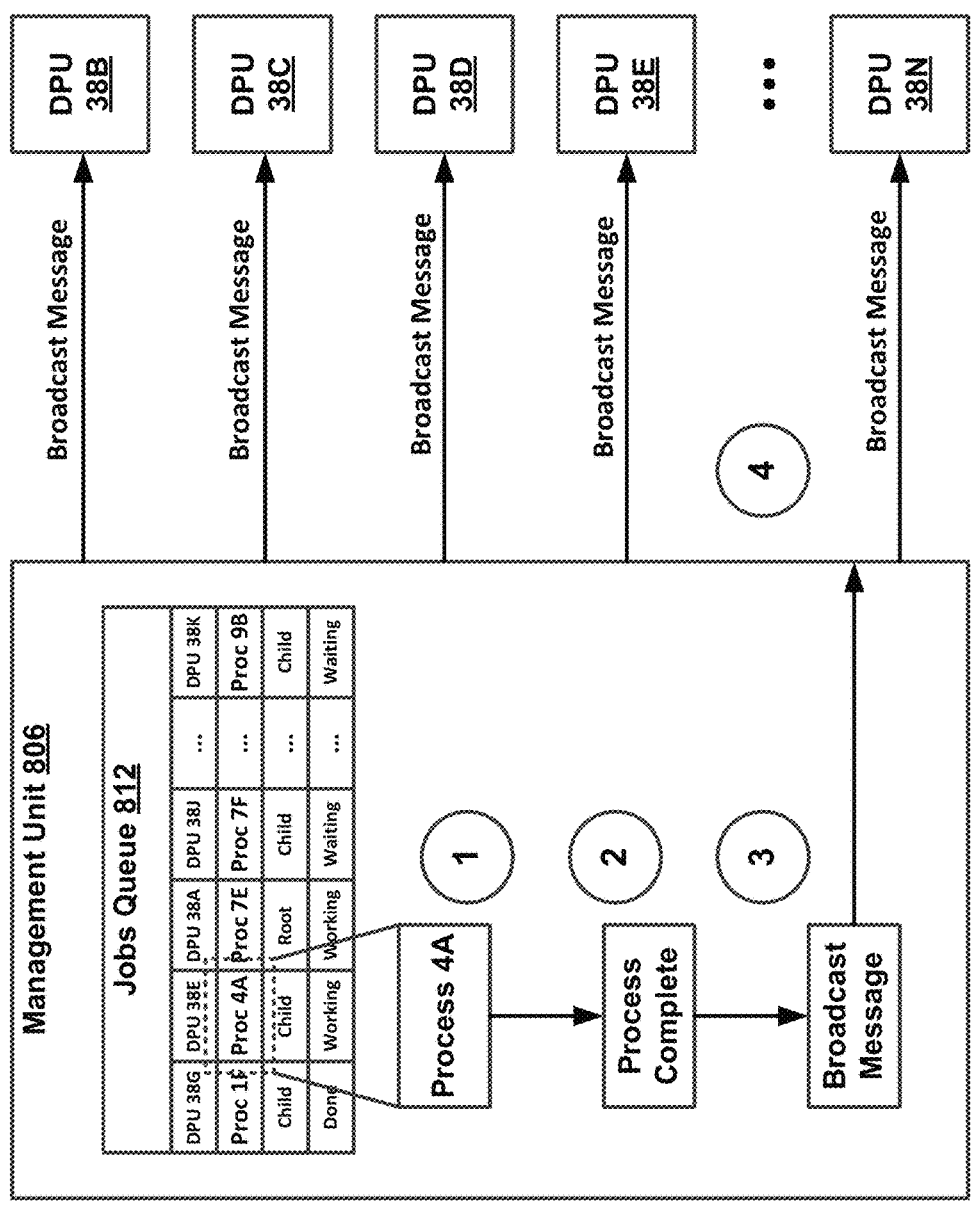
FIG. 10 is a block diagram of an example technique of generating and transmitting broadcast messages according to one or more embodiments.

FIG. 10 is a block diagram of an example technique of generating and transmitting broadcast messages according to one or more embodiments. In some embodiments, the technique can be implemented by any data processing unit of the DPU inter-connection network of data processing units, or any subset of all such data processing units. At a management unit 806 of a DPU, a jobs queue 812 (e.g., as described above), may be utilized for managing a set of processes assigned to be executed by the DPU. In some embodiments, a first DPU retrieves instructions corresponding to a process for execution at the first DPU (e.g., represented by event 1). As shown in FIG. 10, DPU 38A may retrieve instructions for performing Process 4A from jobs queue 812. In some embodiments, jobs queue 812 stores pointers to retrieve the instructions for each respective process listed in the queue (e.g., a reference to a code line comprising executable code).

As shown in FIG. 10, the first DPU is configured to execute and complete the process with the retrieved instructions (e.g., represented by event 2). For example, DPU 38A retrieves instructions for Process 4A and completes Process 4A. In some embodiments, the first DPU is configured to generate a broadcast message (e.g., represented by event 3). Additionally, it may be configured to generate the broadcast message in response to completing the process (e.g., Process 4A) for which instructions were retrieved. In some embodiments, the broadcast message is generated in response to another triggering event such as receipt of instructions or a command to perform a process, or on another basis such as a periodic basis. In some embodiments, the broadcast message indicates an active state of the first data processing unit (e.g., as described above with respect to FIG. 9).

FIG. 10 illustrates that the first DPU is configured to transmit the broadcast message to a set of DPUs (e.g., represented by event 4). For example, the management unit 806 of DPU 38A coordinates transmission of the generated broadcast message to the data processing units DPU 38B to DPU 38N. In some embodiments, the management unit 806 of DPU 38A coordinates transmission of the broadcast message by transmitting the broadcast message to one or more routers (e.g., of the router network described with respect to FIG. 1 above).

Methodologies

Figure 11:
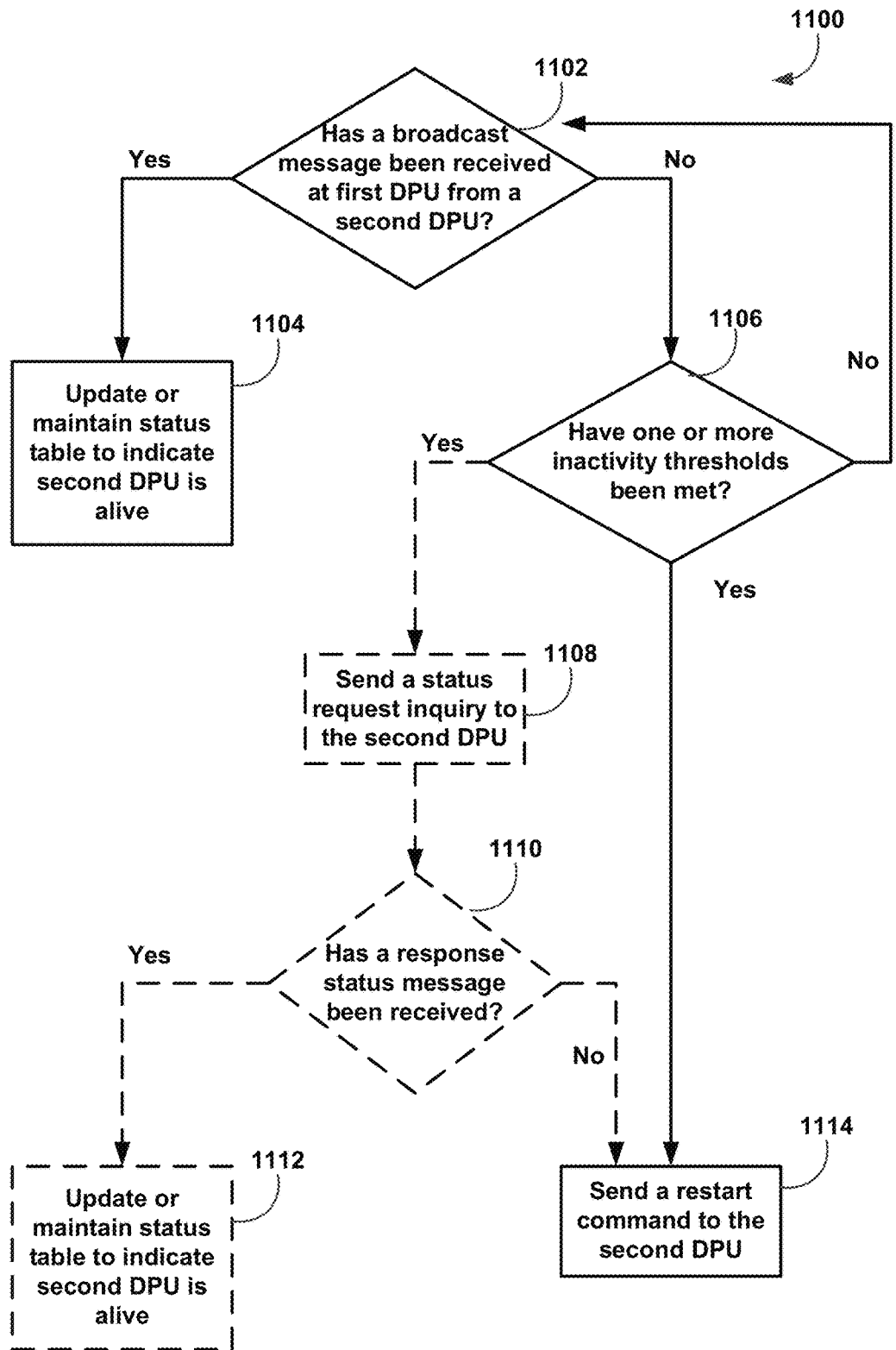
FIG. 11 is a flow diagram illustrating a process for restarting peer data processing units according to one or more embodiments.

FIG. 11 is a flow diagram illustrating a method 1100 for restarting peer data processing units according to one or more embodiments. The method starts at block 1102 where a management unit of a first DPU (e.g., management unit 806 of FIG. 9) makes a determination of whether or not a broadcast message has been received from a second DPU, within this computing system of a plurality of DPUs. If it is determined that a broadcast message is received from the second DPU (e.g., Yes), block 1104 shows that the first DPU (or the management unit of the first DPU) updates or maintains the status table to indicate that the second DPU is alive, active or in a working, responsive state. In some embodiments, the decision at block 1102 involves determining if a valid (e.g., not corrupted, not indicating a health problem) broadcast message was received.

Block 1106 illustrates that if a broadcast message is not received from the second DPU (e.g., No from block 1102), the management unit of the first DPU will determine if one or more inactivity thresholds have been met. For example, a broadcast message may not have been received at the first DPU from the second DPU within a predefined period of time. If it is determined that one or more inactivity thresholds have not been met (e.g., No), the method includes returning to block 1102 and determining if a broadcast message has been received at the first DPU from a second DPU.

Block 1114 illustrates that in some embodiments, if one or more inactivity thresholds have been met by a broadcast message that has not been received at the first DPU (e.g., Yes from block 1106), the method includes sending a restart command to the second DPU. Block 1108 illustrates that in some embodiments, a status request inquiry is optionally sent to the second DPU (e.g., optional Yes from block 1106). Block 1110 illustrates that in some embodiments, after sending a status request inquiry to the second DPU, a decision is made to determine if a response status message has been received from the second DPU. If a response status message has been received (e.g., Yes), block 1112 illustrates that the first DPU (or the management unit of the first DPU) updates or maintains the status table to indicate that the second DPU is alive, active or in a working, responsive state. If a response status message has not been received from the second DPU (e.g., No from block 1110), block 1114 illustrates that the first DPU sends a restart command to the second DPU.

Figure 12:
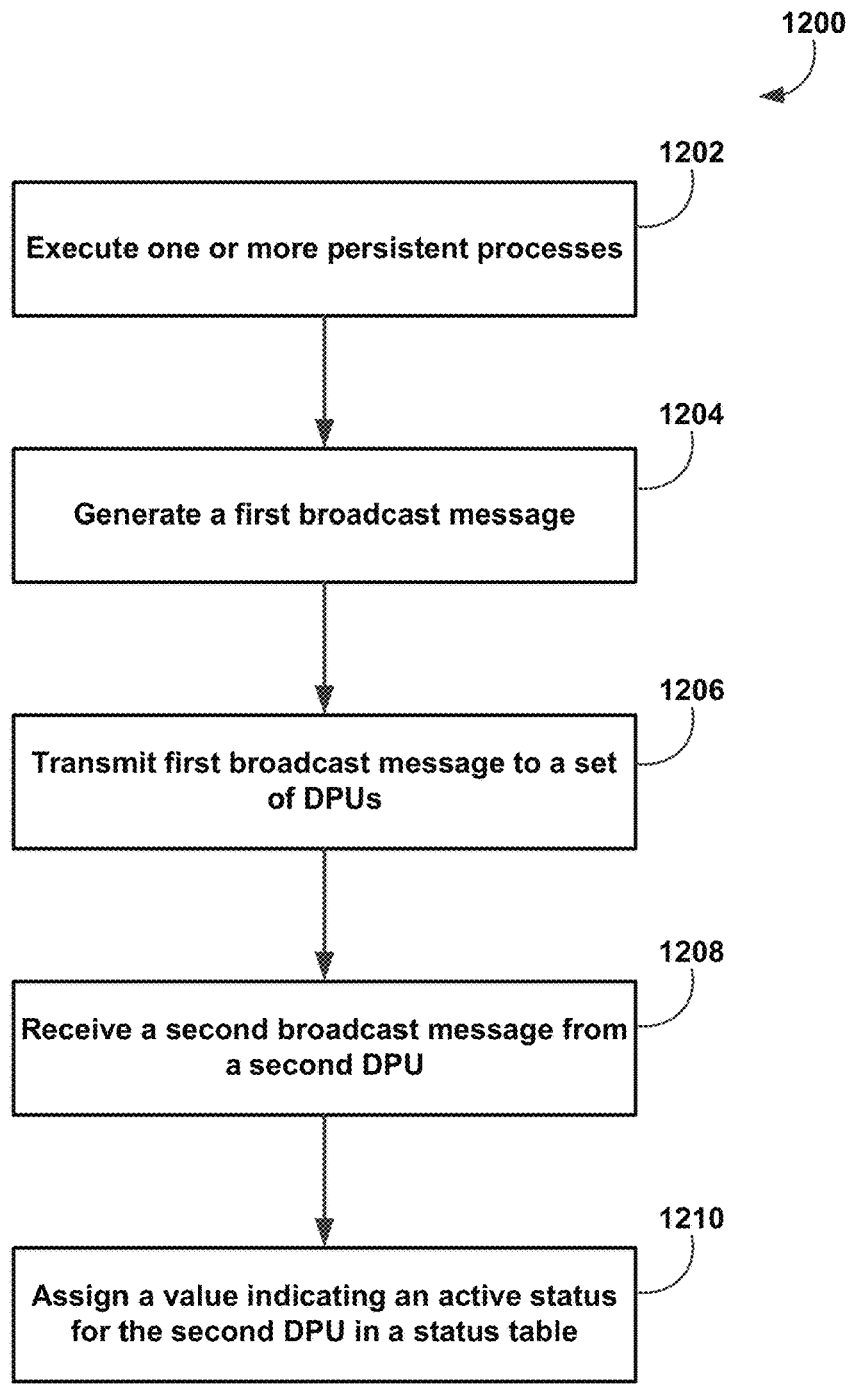
FIG. 12 is a flow diagram illustrating a process for transmitting broadcast messages according to one or more embodiments.

FIG. 12 is a flow diagram illustrating a method 1200 for transmitting broadcast messages according to one or more embodiments. Block 1202 illustrates that in some embodiments, method 1200 includes a first DPU executing one or more persistent processes. Block 1204 illustrates that in some embodiments the first DPU generates a first broadcast message. In some embodiments the broadcast message is generated in response to receiving acknowledgment that the process completed. Method 1200 may further include transmitting the broadcast message to one or more data processing units, as represented by Block 1206. Block 1208 illustrates that in some embodiments the first DPU receives a second broadcast message from a second DPU. In some embodiments, method 1200 includes assigning a value indicating an active status for the second DPU in a status table, as represented by block 1210.

Additional Embodiments

Those skilled in the art will appreciate that in some embodiments, other types of systems, devices, and/or apparatuses can be implemented while remaining within the scope of the present disclosure. In addition, the actual steps taken in the processes discussed herein may differ from those described or shown in the figures. Depending on the embodiment, certain of the steps described above may be removed, others may be added.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A computing system comprising:
a plurality of data processing units (DPUs) each coupled to non-volatile memory, wherein a first DPU of the plurality of DPUs is configured to:
execute one or more persistent processes, wherein the one or more processes persist in the non-volatile memory over power cycles;
generate a first broadcast message upon completion of a first persistent process;
transmit the first broadcast message to a set of DPUs associated with monitoring the first DPU;
receive a second broadcast message from a second DPU of the set of DPUs;
assign a value indicating an active status for the second DPU in a status table to track a status of each DPU of the set of DPUs;
determine a failure to receive the second broadcast message from the second DPU after a period of time exceeding a timing threshold;
assign a value indicating an inactive status for the second DPU in the status table, and
transmit a status inquiry request to the second DPU in response to determining the failure to receive the second broadcast message after a period of time exceeding a timing threshold.

2. The computing system of claim 1, wherein the first broadcast message indicates an active state of the first DPU.

3. The computing system of claim 1, wherein the first DPU is further configured to:
transmit a restart command to the second DPU in response to determining the failure to receive a response to the status inquiry request.

4. The computing system of claim 1, wherein the first DPU is further configured to:
determine a failure to receive a response to the status inquiry request from the second DPU after a period of time exceeding the timing threshold; and
transmit a restart command to the second DPU in response to determining the failure to receive the response to the status inquiry request.

5. The computing system of claim 1, wherein the first DPU is further configured to:
receive a response to the status inquiry request from the second DPU; and
assign the value indicating an active status for the second DPU in the status table to track the status of each DPU of the set of DPUs.

6. The computing system of claim 1, wherein the first DPU is further configured to:
receive a restart command; and
perform a self-restart operation in response to receiving the restart command.

7. The computing system of claim 6, wherein the first DPU is further configured to:
transmit a third broadcast message to the set of DPUs associated with monitoring the first DPU upon successful completion of the self-restart operation.

8. A first data processing unit (DPU) of a plurality of DPUs, each coupled to non-volatile memory, wherein the first DPU is configured to:
execute one or more persistent processes, wherein the one or more processes persist in the non-volatile memory over power cycles;
generate a first broadcast message upon completion of a first persistent process;
transmit the first broadcast message to a set of DPUs associated with monitoring the first DPU;
receive a second broadcast message from a second DPU of the set of DPUs;
assign a value indicating an active status for the second DPU in a status table to track a status of each DPU of the set of DPUs;
determine a failure to receive the second broadcast message from the second DPU after a period of time exceeding a timing threshold;
assign a value indicating an inactive status for the second DPU in the status table; and
transmit a status inquiry request to the second DPU in response to determining the failure to receive the second broadcast message after a period of time exceeding a timing threshold.

9. The first DPU of claim 8, wherein the first broadcast message indicates an active state of the first DPU.

10. The first DPU of claim 8 further configured to: transmit a restart command to the second OPU in response to determining the failure to receive a response to the status inquiry request.

11. The first DPU of claim 8 further configured to: determine a failure to receive a response to the status inquiry request from the second DPU after a period of time exceeding the timing threshold; and transmit a restart command to the second DPU in response to determining the failure to receive the response to the status inquiry request.

12. The first DPU of claim 8 further configured to: receive a response to the status inquiry request from the second DPU; and assign the value indicating an active status for the second DPU in the status table to track the status of each DPU of the set of DPUs.

13. The first DPU of claim 8 further configured to:
receive a restart command; and
perform a self-restart operation in response to receiving the restart command.

14. The first DPU of claim 13 further configured to:
transmit a third broadcast message to the set of DPUs associated with monitoring the first DPU upon successful completion of the self-restart operation.

15. A method of maintaining status of a respective data processing unit (DPU) of a plurality of DPUs, each coupled to non-volatile memory, the method at a first DPU comprising:
executing one or more persistent processes, wherein the one or more processes persist in the non-volatile memory over power cycles;
generating a first broadcast message upon completion of a first persistent process;
transmitting the first broadcast message to a set of DPUs associated with monitoring the first DPU;
receiving a second broadcast message from a second DPU of the set of DPUs;
assigning a value indicating an active status for the second DPU in a status table to track a status of each DPU of the set of DPUs;
determining a failure to receive the second broadcast message from the second DPU after a period of time exceeding a timing threshold;
assigning a value indicating an inactive status for the second DPU in the status table; and
transmitting a status inquiry request to the second DPU in response to determining the failure to receive the second broadcast message after a period of time exceeding a timing threshold.

16. The method of claim 15, wherein the first broadcast message indicates an active state of the first DPU.

17. The method of claim 15 further comprising:
transmitting a restart command to the second DPU in response to determining the failure to receive a response to the status inquiry request.

18. The method of claim 15 further comprising:
determining a failure to receive a response to the status inquiry request from the second DPU after a period of time exceeding the timing threshold; and
transmitting a restart command to the second DPU in response to determining the failure to receive the response to the status inquiry request.

19. The method of claim 15 further comprising:
receiving a response to the status inquiry request from the second DPU; and
assigning the value indicating an active status for the second DPU in the status table to track the status of each DPU of the set of DPUs.

20. The method of claim 15 further comprising:
receiving a restart command; and
performing a self-restart operation in response to receiving the restart command.

21. The method of claim 20 further comprising:
transmitting a third broadcast message to the set of DPUs associated with monitoring the first DPU upon successful completion of the self-restart operation.

* * * * *